United States Patent [19]
Richey et al.

[11] Patent Number: 5,319,801
[45] Date of Patent: Jun. 7, 1994

[54] SEAMLESS FREQUENCY HOPPING SYSTEM

[75] Inventors: Manuel F. Richey, Paola; Rex A. Hand, Gardner; G. Byron Stephens, Wellsville, all of Kans.

[73] Assignee: AlliedSignal Inc., Morris Township, Morris County, N.J.

[21] Appl. No.: 50,713

[22] Filed: Apr. 19, 1993

Related U.S. Application Data

[63] Continuation of Ser. No. 626,805, Dec. 5, 1990, abandoned.

[51] Int. Cl.$^5$ ............................................. H04B 1/40
[52] U.S. Cl. ....................................... 455/79; 381/34; 375/1; 455/234.1
[58] Field of Search .................. 455/71, 72, 78, 79, 455/82–84, 218, 234.1, 296; 333/14; 375/1; 381/34, 35

[56] References Cited

U.S. PATENT DOCUMENTS

| | | | |
|---|---|---|---|
| 4,600,902 | 7/1986 | Lafferty | 333/14 |
| 5,029,182 | 7/1991 | Cai et al. | 375/1 |
| 5,109,525 | 4/1992 | Nichols | 455/78 |

FOREIGN PATENT DOCUMENTS

| | | | |
|---|---|---|---|
| 0068690 | 1/1983 | European Pat. Off. | |
| 2061744 | 7/1971 | Fed. Rep. of Germany. | |
| 3225443 | 1/1984 | Fed. Rep. of Germany | 455/78 |
| 2706615 | 11/1990 | Fed. Rep. of Germany. | |
| 3447548 | 12/1990 | Fed. Rep. of Germany. | |
| 0098326 | 4/1989 | Japan | 455/296 |

Primary Examiner—Reinhard J. Eisenzopf
Assistant Examiner—Chi H. Pham
Attorney, Agent, or Firm—Donald B. Paschburg; Howard G. Massung

[57] ABSTRACT

A seamless frequency hopping system utilizes a programmable digital signal processor with interface circuitry in conjunction with a frequency hopping radio to incorporate the concepts of audio time compression, hop by hop automatic gain control and time repeating squelch to improve the sound of frequency hopped analog communication. Incoming uncompressed audio is first sliced into time segments that each correspond to one frequency hop. The uncompressed audio is then compressed to a certain percentage of its original length in time. A dead time as well as a pilot signal is added to the front of the audio. The processed audio signal is then sent to the radio where it is modulated and broadcast. A second radio receives the incoming signal and demodulates it to once again become an audio signal.

6 Claims, 4 Drawing Sheets

$f_s$ = SAMPLING FREQUENCY
$C_r$ = COMPRESSION RATIO

SEAMLESS FREQUENCY HOPPING SYSTEM

This application is a continuation of application Ser. No. 624,805 filed Dec. 5, 1990, now abandoned.

BACKGROUND OF THE INVENTION

1. Field of the Invention

The present invention is related to communication systems and more specifically to reducing interference while communicating by utilizing frequency hopping.

2. Description of the Prior Art

In any electronic communication system there is a certain amount of interference which must be controlled. This interference can be any electrical or electromagnetic disturbance, phenomena, signal, or emission, man-made or natural, which causes or can cause an undesired response, malfunctioning, or degradation of the electrical performance of electrical equipment. To reduce or eliminate this interference or jamming there are several prior art techniques. One such prior art technique is to utilize frequency hopping.

Several problems are associated with frequency hopping, however. First, the audio signal is chopped with a dead time that occurs at the beginning of each hop. Second, the signal strength varies from hop to hop. Finally, certain channels are already occupied with a strong signal that can drown out the hopping signal. These three phenomena are known as hop noise and can be very distracting.

It is an object of the present invention to avoid the deficiencies of typical frequency hopping as well as the deficiencies of other prior art noise elimination techniques and to provide an improved communication system in which the operator will not notice a change in the audio output from single frequency operation to frequency hopping operations.

SUMMARY OF THE INVENTION

In accordance with the present invention a seamless frequency hopping system is provided which incorporates the concepts of audio time compression, hop by hop automatic gain control and time repeating squelch to improve the sound of frequency hopped analog communication. The system is implemented by utilizing a digital signal processor with its associated electronics in conjunction with a frequency hopping radio.

DETAILED DESCRIPTION OF THE INVENTION

In accordance with the present invention a seamless frequency hopping system is provided which utilizes a digital signal processor (DSP) that time compresses voice during a single frequency dwell and then expands it to completely fill the dwell time including the hop dead time. By utilizing various algorithms, the effect is no change in the audio output from single frequency operation to frequency hopping operations. Therefore, the hopping operation is nearly transparent to the radio operator/pilot and the operator does not hear the annoying repetition-rate clicks associated with a typical hopping operation.

Figure 1:
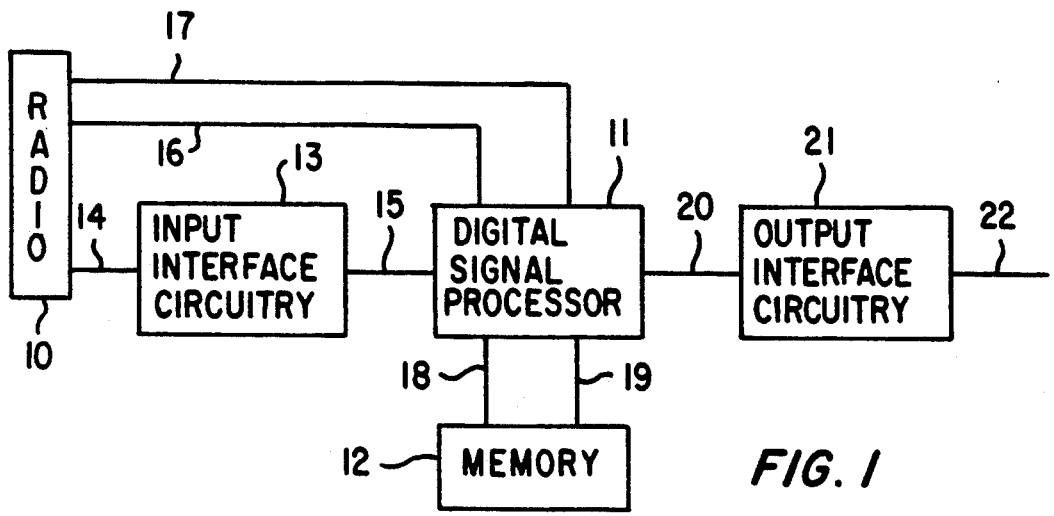
FIG. 1 illustrates a hardware block diagram of the present invention.

Turning now to FIG. 1 of the drawings, we have a hardware block diagram of the seamless frequency hopping system of the present invention. The main component of the hardware of the seamless frequency hopping system is the programmable digital signal processor (DSP) 11. Also shown in FIG. 1 is memory 12 and input interface circuitry 13. As can be seen from FIG. 1 a single analog input, from a frequency hopping radio 10, enters on input line 14 into input interface circuitry 13. Input interface circuitry 13 can be an ATT 7522 codec or any similar device having analog to digital converter and an anti-aliasing filter. In this example, input interface circuitry 13 has a sample rate of approximately 8 KHZ. From input interface circuitry 13 the signal follows, in a serial manner, line 15 which connects input interface circuitry 13 with digital signal processor 11. Digital signal processor 11 which may likewise be a commercially available integrated circuit such as marketed by AT&T under their trade designation ATT DSP32C or any similar device, interfaces to a frequency hopping radio 10 through a transmit receive line 16 and a change frequency strobe line 17. Digital signal processor 11 also interfaces with memory 12 through address line 18 and data line 19 in a manner which is known by one skilled in the art. Digital signal processor 11 with memory 12 performs software processing as discussed below. Memory 12 in this example is a 4K×32 EEPROM, but may be any similar storage device. After software processing, an output from digital signal processor 11 follows, in a serial manner, output line 20. Output line 20 connects digital signal processor 11 with output interface circuitry 21. Output interface circuitry 21 can be an AT&T 7522 codec or any similar device having a digital to analog converter and an anti-aliasing filter. After output interface circuitry 21, the processed signal flows out of the seamless frequency hopping system on analog output line 22 to a frequency hopping radio 10. The system will sense when the radio is transmitting via transmit/receive line 16. When transmitting, the system receives audio from the radio microphone port via input line 14 and outputs audio to the radio transmitter via output line 22. When receiving, the system receives audio in from the radio receiver via input line 14 and outputs audio to the radio audio amplifier via output line 22. The multiplexing of these analog lines is handled external to the system by the radio.

Figure 2:
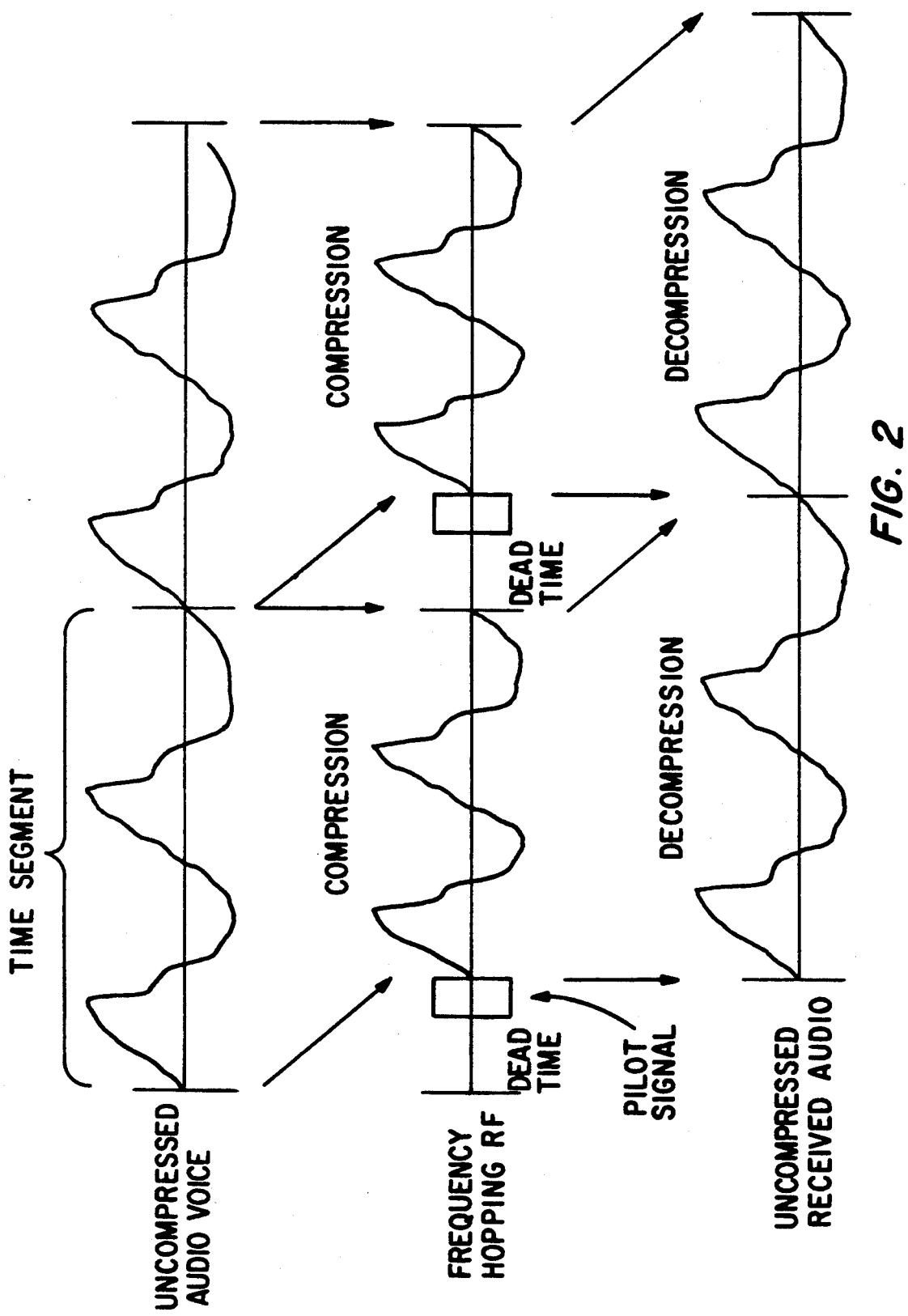
FIG. 2 illustrates frequency hopping audio time compression.

The concepts of seamless frequency hopping are illustrated in FIG. 2. At the top of FIG. 2, incoming uncompressed audio is first sliced into time segments that each correspond to one frequency hop. The uncompressed audio is then compressed to a certain percentage of its original length in time. A dead time as well as a pilot signal are added to the front of the audio. The pilot signal is used for synchronization, automatic gain control (AGC), squelch and algorithm activation. The processed audio signal is then sent to the radio where it is modulated and broadcast.

A second radio receives the incoming signal and demodulates it to once again become an audio signal. The received audio is first passed through a correlator to detect the pilot signal that was inserted at the front of the hopped audio. The peak output from the correlator is used to set the gain control and the squelch for the entire hop. If that output is too low, then the pilot signal wasn't detected and the audio signal from the previous hop is replicated for this hop. This process is known as "repetitive squelch". If the correlator peak output passes a certain threshold, then the pilot signal is considered detected. The audio for the entire hop is then multiplied by the reciprocal of the peak value (i.e. gain=-constant/peak). This is known as "hop by hop AGC". The audio following the pilot signal is then expanded (or uncompressed) in time by the same percentage that it was originally compressed. The uncompressed received audio is illustrated at the bottom of FIG. 2.

Figure 3:
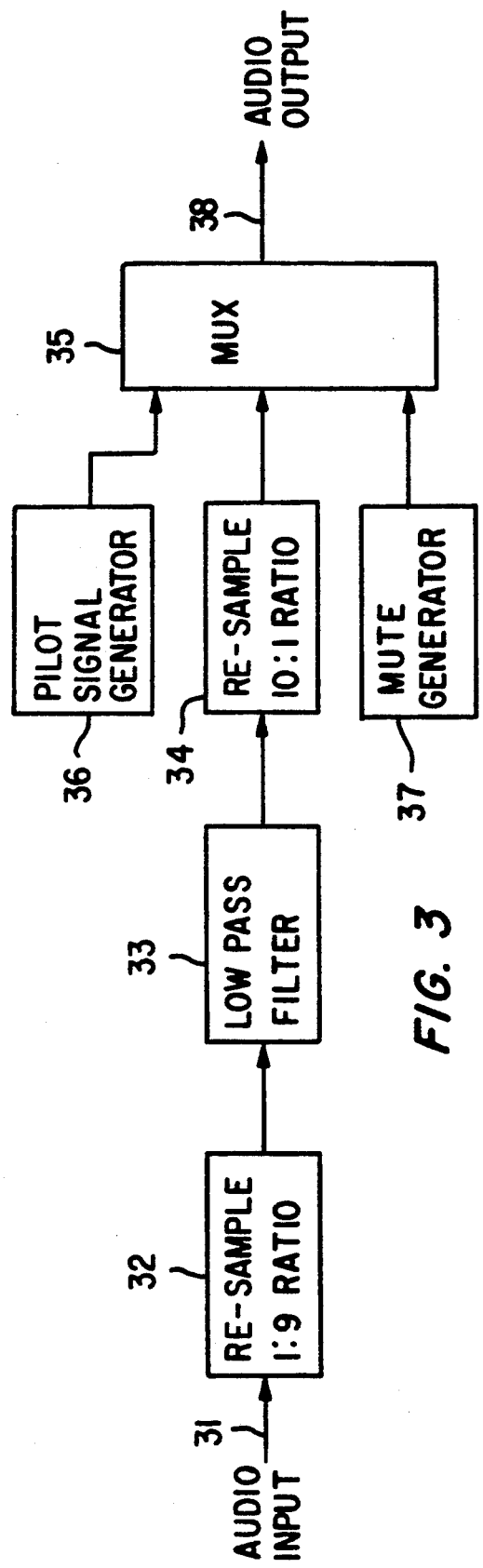
FIG. 3 illustrates a transmit algorithm for frequency hopping.

The digital signal Processor illustrated in FIG. 1 implements seamless frequency hopping in the time domain by using standard digital signal processing techniques for interpolation and decimation to accomplish the audio time compression. The transmit algorithm for frequency hopping is illustrated in FIG. 3. As an example of its operating characteristics we will assume that there are 2,000 samples per hop and a 90% compression ratio. In this embodiment, the input line 31 carries 2,000 samples of audio input collected as a lot. This lot enters a 1:9 resampler where the lot is padded with zeros to a 9:1 ratio bringing the total number of samples in the lot to 18,000. The resampled lot then flows through low pass filter 33 and enters 10:1 resampler 34 where the filtered lot is resampled at a 10:1 ratio (i.e. every tenth sample is selected and the others are discarded). This brings the lot size down to 1,800 samples. These compressed audio samples then enter mux 35 which also receives a signal from pilot signal generator 36 and mute signal generator 37. Audio output exits mux 35 on output line 38. Mux 35 is sequenced at each hop to allow 100 mute samples (zeros) to pass at the beginning of a hop (indicated by change frequency strobe 17 of FIG. 1), followed by 100 samples from the pilot signal generator 36, followed by the 1,800 samples of compressed audio. Thus, 2,000 audio samples are collected from audio input interface circuitry (13 of FIG. 1) for processing and 2,000 samples are sent on to audio output interface circuitry (21 of FIG. 1) after processing.

Figure 4:
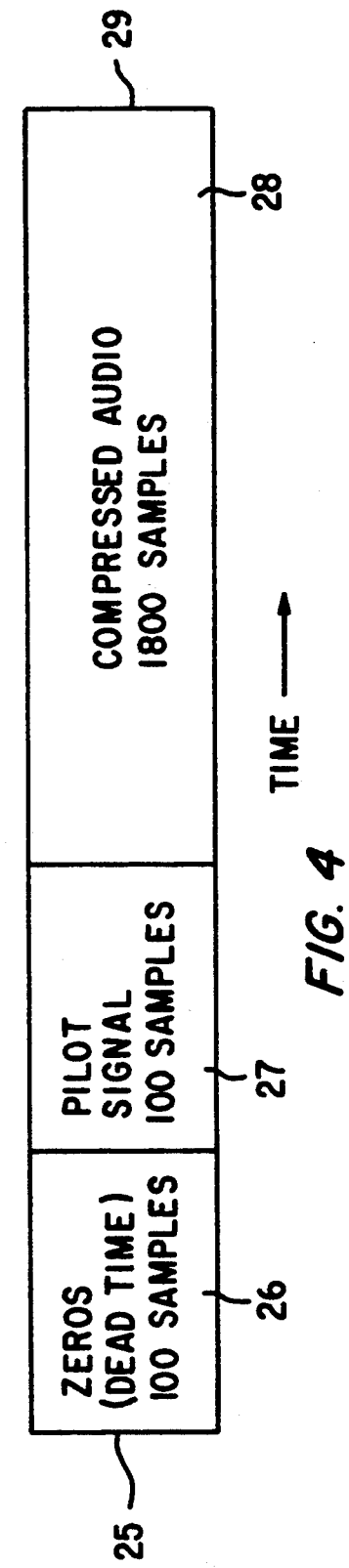
FIG. 4 illustrates the contents of a transmit hop frame after processing.

The contents of the transmit hop frame after processing are illustrated in FIG. 4. At start of hop 25 there exists 100 samples of zeros (dead time) 26 followed by 100 samples of pilot signal 27 followed by 1800 samples of compressed audio 28 followed by end of hop 29.

Figure 5:
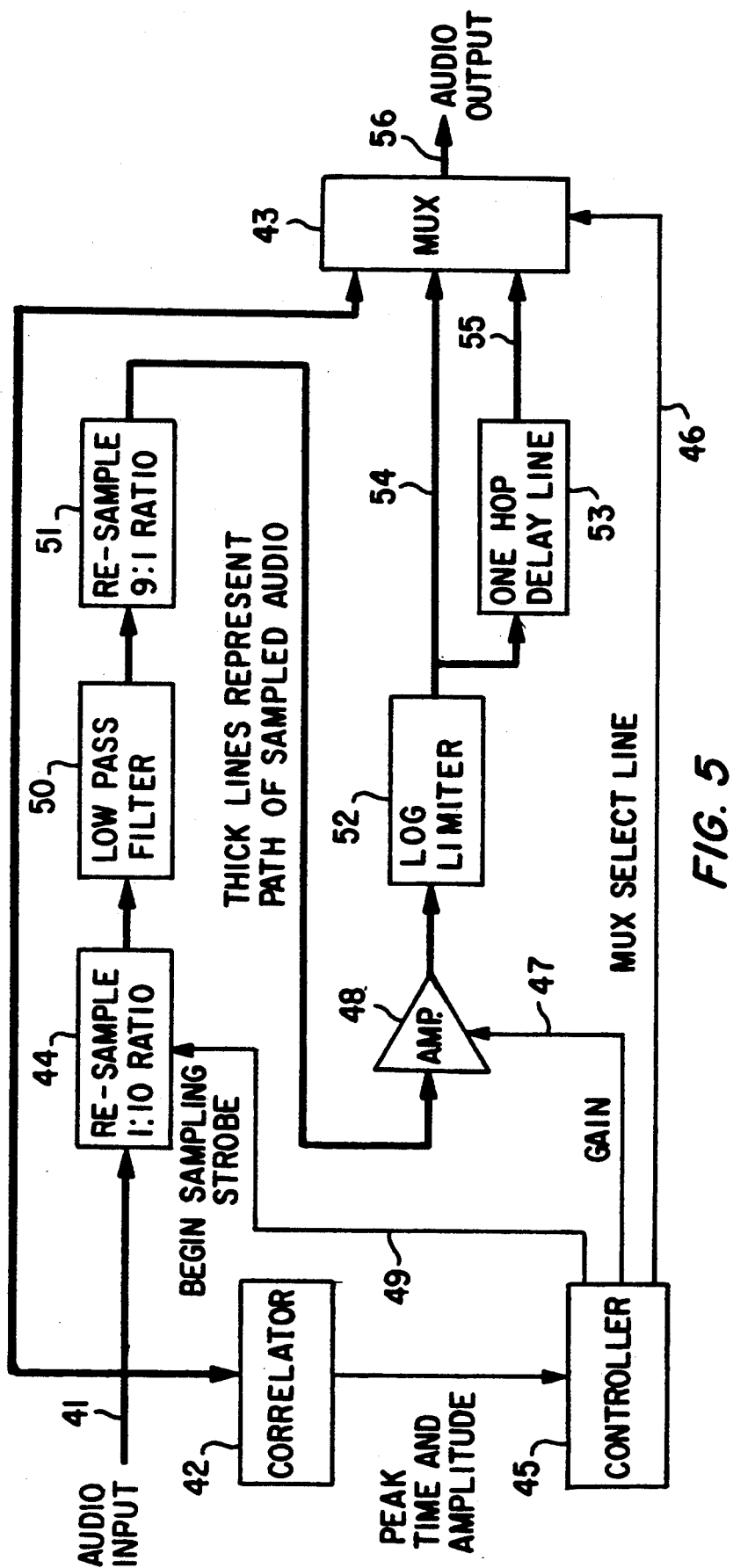
FIG. 5 illustrates a receive algorithm for frequency hopping.

FIG. 5 illustrates a receive algorithm for seamless frequency hopping. Once again, assuming that there are 2,000 samples per hop and a 90% compression ratio the following will illustrate the operating characteristics of the receive algorithm. A sampled audio input enters on input line 41 and is split between a correlator 42, a multiplexor 43 and a 1:10 resampler 44. The correlator correlates the received audio with a stored replica of the pilot signal and detects the time and amplitude of the peak. This information is passed on to Controller 45. The controller uses this information to control the Mux Select Line 46, to set the gain line 47 for amplifier 48, and to assert the Begin Sampling Strobe 49 that enables the 1:10 resampler to begin collecting samples. The 1:10 resampler does not begin collecting samples until this line is asserted. The controller asserts this line at the time the peak is detected by the correlator. This occurs when the correlator detects the pilot signal and thus provides accurate synchronization on a hop by hop basis. Thus, the resampler will not begin collecting samples until after approximately 200 samples have already been collected. The next 1,800 samples are then padded with zeros to a 10:1 ratio bringing the total number of samples in the lot to 18,000. The resampled lot then flows through low pass filter 50 and enters 9:1 resampler 51 where the filtered lot is resampled at a 9:1 ratio (i.e. every ninth sample is selected and the others are discarded) bringing the lot size down to 2,000 samples. These 2,000 samples then enter amplifier 48 which also receives gain signal 47 from Controller 45. The amplified output then enters logarithmic limiter 52 which reduces the peak signal output to a value that is below the maximum allowable D/A converter value. The output from the logarithmic limiter enters both multiplexor 43 and one hop delay line 53. The one hop delay line in this embodiment is a 2,000 sample delay line which, in essence, presents the output from the last hop to multiplexor 43. Controller 45 via Mux Select Line 46 selects which multiplexor input is passed through the multiplexor and out of the system. The controller selects which signal to output based on the peak amplitude it receives from correlator 42. The controller integrates this value to determine if a pilot signal is being sent on a consistent basis. If not, the controller effectively bypasses the seamless frequency hop processing by passing line 41 to the multiplexor output. If the pilot signal is being consistently sent and the current hop's peak amplitude exceeds a detection threshold, then line 54 is passed through to the multiplexor output. If the pilot signal is being consistently sent but the current hop's peak amplitude does not exceed the detection threshold, then the samples from the last hop (line 55) are passed to the multiplexor output enabling the repetitive squelch. Audio output exits multiplexor 43 on audio output line 56 and the output data is sent to audio output interface circuitry (21 of FIG. 1).

Figure 6:
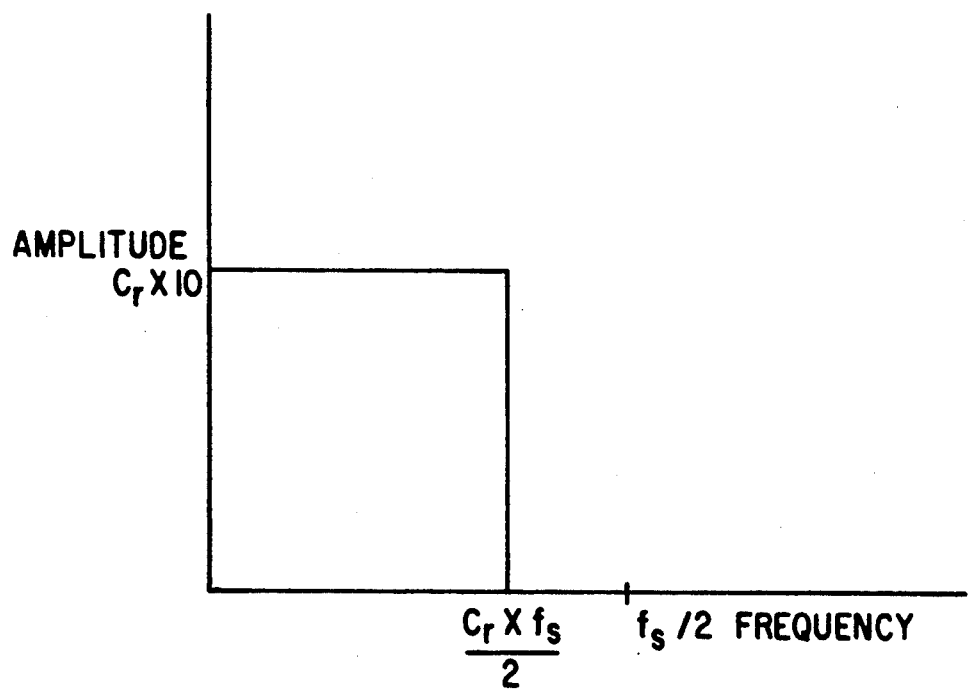
FIG. 6 illustrates magnitude response of an ideal interpolation low pass filter.

The low pass filters in both the receive and transmit channels require the stopband frequency to be less than 0.45 times the original sampling frequency (the general case is: stopband frequency=sampling frequency * compression ratio/2). The closer the frequency response to the ideal filter shown in FIG. 6, the better the performance of the system.

The pilot signal that is transmitted with the compressed audio could be a single frequency sinusoid, a chirped sinusoid (a sinusoid whose frequency changes linearly with time) or a digitally coded waveform. The critical point is that a replica of the pilot signal be stored in the correlator at the receiver (If the waveform is complex, the conjugate of the pilot signal must be stored in the correlator). In this embodiment, the pilot signal is a sinusoid whose frequency is linearly increased in time from 0.0625 times the sampling frequency (500 Hz.) to 0.375 times the sampling frequency (3 KHz.) over the space of 100 samples (12.5 msec).

The software implementation of the frequency hopping processor here described collects the samples in small lots and then processes them as such. The processes of audio time compression and expansion that are accomplished with zero stuff/low pass filter/re-sample stages are integrated and implemented as two individual routines (expand and compress). It is important to note that during the process of resampling, most of the audio samples are discarded. In a preferred embodiment, these discarded samples would not be calculated in the first place in order to reduce throughput loading in the digital signal processor.

The seamless frequency hopping system of the present invention can be utilized in any frequency hopping communication scheme. It is not intended that this invention be limited to the hardware or software arrangement, or operational procedures shown disclosed. This invention includes all of the alterations and variations thereto as encompassed within the scope of the claims as follows.

We claim:

1. A seamless frequency hopping system for use in conjunction with a frequency hopping radio of the type including a radio microphone port, a radio audio amplifier port, a radio transmitter and a radio receiver, said system comprising:

audio input interface circuitry means including analog to digital converter means and anti-aliasing filter means for receiving an analog input from said radio via an input line and for providing a digitized signal;

digital signal processor means connected to said radio via a transmit/receive line and a change frequency strobe line, and connected to said input interface circuitry means for processing said digitized signal and for providing a processed signal, said digital signal processor means including means for implementing seamless frequency hopping on said digitized signal in the time domain via audio time compression for providing said processed signal;

memory means connected to said digital signal processor means for providing storage for said digital signal processor means;

audio output interface circuitry means including digital to analog connector means and anti-aliasing filter means connected to said digital signal processor means and connected to said radio for receiving said processed signal from said digital signal processor means and for providing an output signal to said radio via an output line; and said system sensing via the transmit/receive line when said radio is in a transmitting mode and in a receiving mode, and when said radio is in the transmitting mode said system receives an audio signal from the radio microphone port via the input line and outputs a processed audio signal for transmission to the radio transmitter via the output line, and when said radio is in the receiving mode said system receives an audio signal from the radio receiver via the input line and outputs a processed audio signal for transmission to the radio amplifier via the output line.

2. A seamless frequency hopping system as claimed in claim 1 wherein said input interface circuitry means is an ATT 7522 codec.

3. A seamless frequency hopping system as claimed in claim 1 wherein said input interface circuitry means has a sample rate of 8 KHZ.

4. A seamless frequency hopping system as claimed in claim 1 wherein said digital signal processor means is an ATT DSP 32 C.

5. A seamless frequency hopping system as claimed in claim 1 wherein said memory means is an EEPROM.

6. A seamless frequency hopping system as claimed in claim 1 wherein said output interface circuitry means is an ATT 7522 codec.

* * * * *